US012736699B1

(12) United States Patent
Zhang et al.

(10) Patent No.: US 12,736,699 B1
(45) Date of Patent: Sep. 15, 2026

(54) FRESNEL ZONE PICKING MODEL AND TRAINING METHOD THEREFOR, AND DIFFRACTION WAVE IMAGING METHOD BASED ON MACHINE LEARNING

(71) Applicant: INSTITUTE OF GEOLOGY AND GEOPHYSICS, CHINESE ACADEMY OF SCIENCES, Beijing (CN)

(72) Inventors: Jiangjie Zhang, Beijing (CN); Zhitao Yu, Beijing (CN); Hongwei Gao, Beijing (CN); Linong Liu, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 19/299,387

(22) Filed: Aug. 14, 2025

(30) Foreign Application Priority Data

Apr. 8, 2025 (CN) ........................ 202510435743.X

(51) Int. Cl.
*G01V 1/36* (2006.01)
*G01V 1/34* (2006.01)

(52) U.S. Cl.
CPC .............. *G01V 1/362* (2013.01); *G01V 1/345* (2013.01)

(58) Field of Classification Search
None
See application file for complete search history.

(56) References Cited

U.S. PATENT DOCUMENTS

2007/0102629 A1* 5/2007 Richard .................. G01S 13/04 250/225
2009/0279386 A1* 11/2009 Monk .................. G01V 1/3808 367/21
2012/0010820 A1* 1/2012 Winbow ................ G01V 1/303 702/18

OTHER PUBLICATIONS

Sun, Hui, et al. "Automatic Fresnel zone picking in the dip-angle domain using deep neural networks." Journal of Geophysics and Engineering 16.1 (2019): 136-145. (Year: 2019).*
Maciel, Susanne, and Ricardo Biloti. "A statistics-based descriptor for automatic classification of scatterers in seismic sections." Geophysics 85.5 (2020): O83-O96. (Year: 2020).*
Jarreau, Brittney Erin, and Sanichiro Yoshida. "Deep Machine Learning for Path Length Characterization Using Acoustic Diffraction." Applied Sciences 13.5 (2023): 2782. (Year: 2023).*

(Continued)

*Primary Examiner* — Jonathan D Armstrong

(57) ABSTRACT

Provided are a Fresnel zone picking model and training method therefor, and a diffraction wave imaging method based on machine learning. The training method includes acquiring seismic wave training data; labeling a Fresnel zone label for the set of horizontal slice images of the initial 3D dip-angle gathers to obtain a set of true labels; inputting the set of horizontal slice images and the set of true labels of the initial 3D dip-angle gathers into a pre-constructed Fresnel zone picking model for iterative training, so as to obtain a prediction result of the Fresnel zone; and updating parameters of the Fresnel zone picking model for each training based on the true label of the Fresnel zone and a loss value of the prediction result until a preset iteration condition is reached. The diffraction wave imaging method performs the diffraction wave imaging by using the trained Fresnel zone picking model.

8 Claims, 9 Drawing Sheets

(56) References Cited

OTHER PUBLICATIONS

Madali, Nabil. Accurate scene geometry retrieval and motion estimation using deep learning tech-niques for holographic video compression. Diss. Institut national des sciences appliquées de Rennes, 2024. (Year: 2024).*

Zhu, Feng, et al. "Automatic estimation of Fresnel zones in migrated dip-angle gathers using semantic segmentation model." IEEE Transactions on Geoscience and Remote Sensing 62 (2024): 1-14. (Year: 2024).*

* cited by examiner

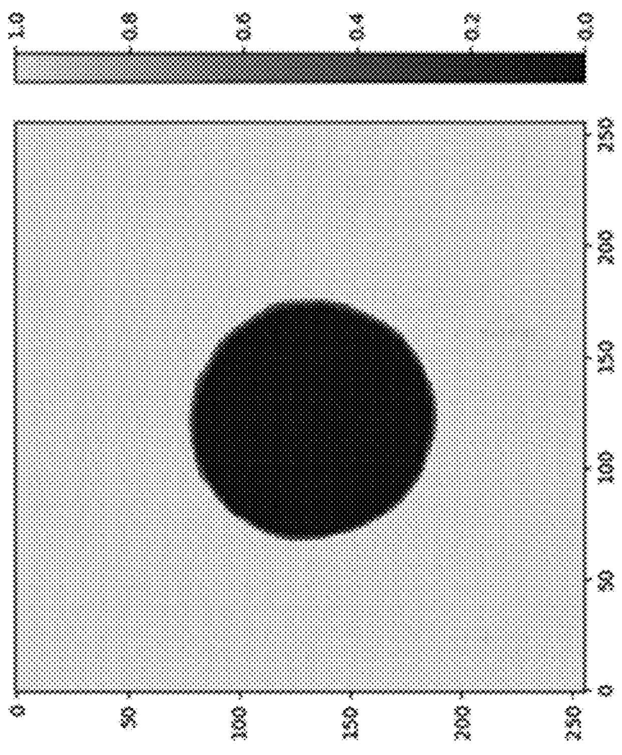
FIG. 5
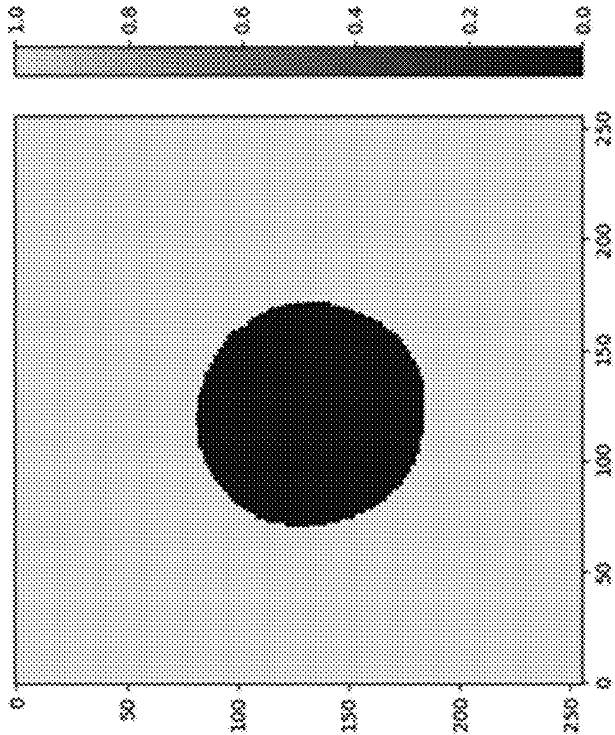

FRESNEL ZONE PICKING MODEL AND TRAINING METHOD THEREFOR, AND DIFFRACTION WAVE IMAGING METHOD BASED ON MACHINE LEARNING

CROSS-REFERENCE TO RELATED APPLICATIONS

The present disclosure claims the priority to the Chinese patent application with the filling No. 202510435743.X filed with the Chinese Patent Office on Apr. 8, 2025, and entitled "FRESNEL ZONE PICKING MODEL AND TRAINING METHOD THEREFOR, AND DIFFRACTION WAVE IMAGING METHOD BASED ON MACHINE LEARNING", the contents of which are incorporated herein by reference in entirety.

TECHNICAL FIELD

The present disclosure relates to the technical field of geological survey, and specifically to a Fresnel zone picking model and a training method therefor, and a diffraction wave imaging method based on machine learning.

BACKGROUND ART

In geological exploration, the diffraction wave field is generated by small-scale discontinuities in the subsurface, and the diffraction waves contain a large amount of high-resolution information about the underground micro-uniform geologic body. Therefore, the diffraction wave imaging has a natural advantage in identifying the small-scale variations of microstructures in the geologic body, which can break through the limitation to the resolution by the wavelength corresponding to the main frequency of seismic waves in the reflection wave imaging, and is of great significance for improving the ability of identifying anomalies of tiny geologic bodies in the oil and gas exploration.

The key of diffraction wave imaging is how to separate the diffraction wave from the reflection wave field, or how to effectively suppress the reflection wave. The main energy of reflection wave imaging comes from the corresponding reflection Fresnel zone. However, the reflection Fresnel zone is related to the imaging depth, offset distance, and stratum dip-angle, and displays different shapes in different data domains. Especially in the region where a diffraction body exists, it becomes more complex. Therefore, picking up a Fresnel zone is a task that is repetitive and very time-consuming. Manual picking is used in the prior art, which is inefficient, and in turn results in low imaging efficiency. Meanwhile, the manual picking results rely heavily on the personal experience of the operator, which results in lower accuracy, thereby affecting the imaging accuracy of the diffraction wave.

SUMMARY

In view of this, an objective of the present disclosure is to provide a Fresnel zone picking model and a training method therefor, and a diffraction wave imaging method based on machine learning, so as to improve the efficiency and accuracy of the diffraction wave imaging.

In a first aspect, a Fresnel zone picking model is provided, including an encoder and a decoder, wherein

- the encoder includes an input unit and a plurality of feature extraction units, and each of the feature extraction units includes a first convolution module, an activation function, and a second convolution module, wherein the activation function is a Tanh activation function, and the second convolution module has a convolution kernel size of 3*3 and a stride of 2; and
- the decoder includes the same number of feature reconstruction units as the feature extraction units, and an output unit, and each of the feature reconstruction units includes a deconvolution module.

In a second aspect, a training method for the Fresnel zone picking model is provided, and the method includes:

- acquiring seismic wave training data of a target work zone, wherein the seismic wave training data includes a set of horizontal slice images of initial 3D dip-angle gathers corresponding to all imaging points on a target imaging line in a seismic wave imaging space;
- labeling a Fresnel zone label for the set of horizontal slice images of the initial 3D dip-angle gathers to obtain a set of true labels;
- inputting the set of horizontal slice images and the set of true labels of the initial 3D dip-angle gathers into a pre-constructed Fresnel zone picking model for iterative training, so as to obtain a prediction result of the Fresnel zone; and
- updating parameters of the Fresnel zone picking model for each training based on the true labels of the Fresnel zone and a loss value of the prediction result until a preset iteration condition is reached.

Optionally, the step of labeling a Fresnel zone label for the set of horizontal slice images of the initial 3D dip-angle gathers to obtain a set of true labels includes:

- picking up a Fresnel zone in each horizontal slice in the set of horizontal slice images of the initial 3D dip-angle gathers;
- muting the picked Fresnel zone;
- producing the set of true labels according to the set of horizontal slice images after muting the Fresnel zone.

Optionally, the Fresnel zone is in an elliptical shape on the horizontal slice, and the step of picking up a Fresnel zone in each horizontal slice in the set of horizontal slice images of the initial 3D dip-angle gathers includes:

- acquiring 3D dip-angle gather data corresponding to the horizontal slice for each horizontal slice in the set of horizontal slice images of the initial 3D dip-angle gathers, wherein the 3D dip-angle gather data includes a seismic wave two-way traveltime, a dip-angle in x-direction and a dip-angle in y-direction corresponding to the seismic trace, and a main frequency of the seismic wave;
- calculating radii of the Fresnel zone in two directions based on the 3D dip-angle gather data and a picking formula of the Fresnel zone, and determining a range of the Fresnel zone based on the radii in the two directions and a stationary phase point, wherein the picking formula of the Fresnel zone is:

$$\gamma_x = \arccos\left(\frac{T_0/\cos(\varphi_{x0}) - f_d/4}{T_0/\cos(\varphi_{x0})}\right),$$

$$\gamma_y = \arccos\left(\frac{T_0/\cos(\varphi_{y0}) - f_d/4}{T_0/\cos(\varphi_{y0})}\right),$$

where $\gamma_x$ is the radius of the Fresnel zone in the x-direction; $\gamma_y$ is the radius of the Fresnel zone in y-direction; $T_0$ is the seismic wave two-way traveltime; $f_d$ is the main frequency of the seismic wave; and $(\varphi_{x_0}, \varphi_{y_0})$ is the stationary phase point of the 3D dip-angle gathers at the imaging point on the corresponding horizontal slice, and $\varphi_{x_0}$, $\varphi_{y_0}$ respectively correspond to stratum dip-angles in x-direction and y-direction of the stratum where the imaging point is located.

Optionally, each training process of the iterative training includes:

receiving the set of horizontal slice images and the set of true labels of the initial 3D dip-angle gathers based on the input unit of the Fresnel zone picking model;

extracting a Fresnel zone feature of the set of horizontal slice images of the initial 3D dip-angle gathers based on a first convolution module, and detecting an edge of the Fresnel zone in each horizontal slice based on the Fresnel zone feature, wherein the Fresnel zone feature at least includes a shape, a position, and a relative relationship between internal and external energy strengths of the Fresnel zone;

increasing a complexity of the extracted Fresnel zone feature based on a Tanh activation function;

reducing a spatial resolution of each slice in the set of slice images based on a second convolution module with a convolution kernel size of 3*3 and a stride of 2;

after several feature extractions, gradually recovering the spatial resolution of each horizontal slice in the set of slice images by the deconvolution module, and fusing the horizontal slices with the same spatial resolution in feature extraction and feature reconstruction; and outputting a final prediction result of the detected Fresnel zone by the output unit.

Optionally, an expression of the output unit is:

$$\text{output} = (e^{pro*m} - 1)/(e^{m} - 1),$$

where pro represents a probability value of a single pixel point classified into the Fresnel zone region in the output, represented by a value from 0 to 1; and m represents a parameter controlling a degree of external energy attenuation of the Fresnel zone.

In a third aspect, a diffraction wave imaging method based on machine learning is provided, and the method includes:

acquiring seismic wave detection data of a target work zone, wherein the seismic wave detection data includes a set of horizontal slice images of 3D dip-angle gathers corresponding to all imaging points on all imaging lines in a seismic wave imaging space;

inputting the set of horizontal slice images of the 3D dip-angle gathers into a pre-trained Fresnel zone picking model to pick up a Fresnel zone of a horizontal slice corresponding to each of the imaging points;

muting the picked Fresnel zone in the set of horizontal slice images of the 3D dip-angle gathers;

stacking the set of horizontal slice images of the 3D dip-angle gathers after muting the Fresnel zone, so as to obtain a diffraction wave imaging profile.

In a fourth aspect, a diffraction wave imaging device based on machine learning is provided, and the device includes:

an acquisition unit, configured to acquire seismic wave detection data of a target work zone, wherein the seismic wave detection data includes a set of horizontal slice images of 3D dip-angle gathers corresponding to all imaging points on all imaging lines in a seismic wave imaging space;

a picking unit, configured to input the set of horizontal slice images of the 3D dip-angle gathers into a pre-trained Fresnel zone picking model to pick up a Fresnel zone of a horizontal slice corresponding to each of the imaging points;

a mute unit, configured to mute the picked Fresnel zone in the set of horizontal slice images of the 3D dip-angle gathers; and a stack unit, configured to stack the set of horizontal slice images of the 3D dip-angle gathers after muting the Fresnel zone, so as to obtain a diffraction wave imaging profile.

In a fifth aspect, an electronic device is provided, including a processor, a communication interface, a memory, and a communication bus, wherein the processor, the communication interface, and the memory are communicated with each other via the communication bus;

the memory is configured to store computer programs; and the processor is configured to realize steps in the method described in the second aspect or third aspect when executing the programs stored in the memory.

In a sixth aspect, a computer-readable storage medium is provided, wherein the computer-readable storage medium stores computer programs, and the computer programs execute steps in the method described in the second aspect or the third aspect when executed by a processor.

The embodiments of the present disclosure provide a Fresnel zone picking model and the training method therefor, and a diffraction wave imaging method based on machine learning, which perform training based on the improved Fresnel zone picking model. The training method includes the following steps: acquiring seismic wave training data; labeling a Fresnel zone label for the set of horizontal slice images of the initial 3D dip-angle gathers to obtain a set of true labels; inputting the set of horizontal slice images and the set of true labels of the initial 3D dip-angle gathers into a pre-constructed Fresnel zone picking model for iterative training, so as to obtain a prediction result of the Fresnel zone; updating parameters of the Fresnel zone picking model for each training based on the true label of the Fresnel zone and a loss value of the prediction result until a preset iteration condition is reached; and performing the diffraction wave imaging by using the trained Fresnel zone picking model. The present disclosure introduces a neural network to pick up the Fresnel zone based on the 3D dip-angle gathers, and its horizontal feature is elliptical. Compared with the conventional method in which the Fresnel zone boundaries are respectively extracted based on the 2D dip-angle gathers in mutually perpendicular x-direction and y-direction to form a rectangle, this feature better corresponds to the Fresnel zone in the dip-angle domain, thereby improving the accuracy of the picked Fresnel zone, and further improving the accuracy of the diffraction wave imaging. In addition, a higher efficiency is enabled by using the trained Fresnel zone picking model to separate the reflection wave and perform the diffraction wave imaging.

In order to make the above objectives, features, and advantages of the present disclosure more obvious and understandable, the following preferable embodiments, together with the drawings, are described in detail as follows.

BRIEF DESCRIPTION OF DRAWINGS

In order to more clearly illustrate the technical solutions in the embodiments of the present disclosure, the following will briefly introduce the drawings to be used in the embodiments. It is to be understood that the following drawings illustrate only certain embodiments of the present disclosure, and therefore should not be regarded as a limitation of the scope. For persons of ordinary skill in the field, other relevant drawings can be obtained according to these drawings without inventive efforts.

FIG. 5 shows a comparison schematic diagram of an output result before and after the improvement of an output unit provided by the embodiments of the present disclosure;

DETAILED DESCRIPTION OF EMBODIMENTS

Figure 1:
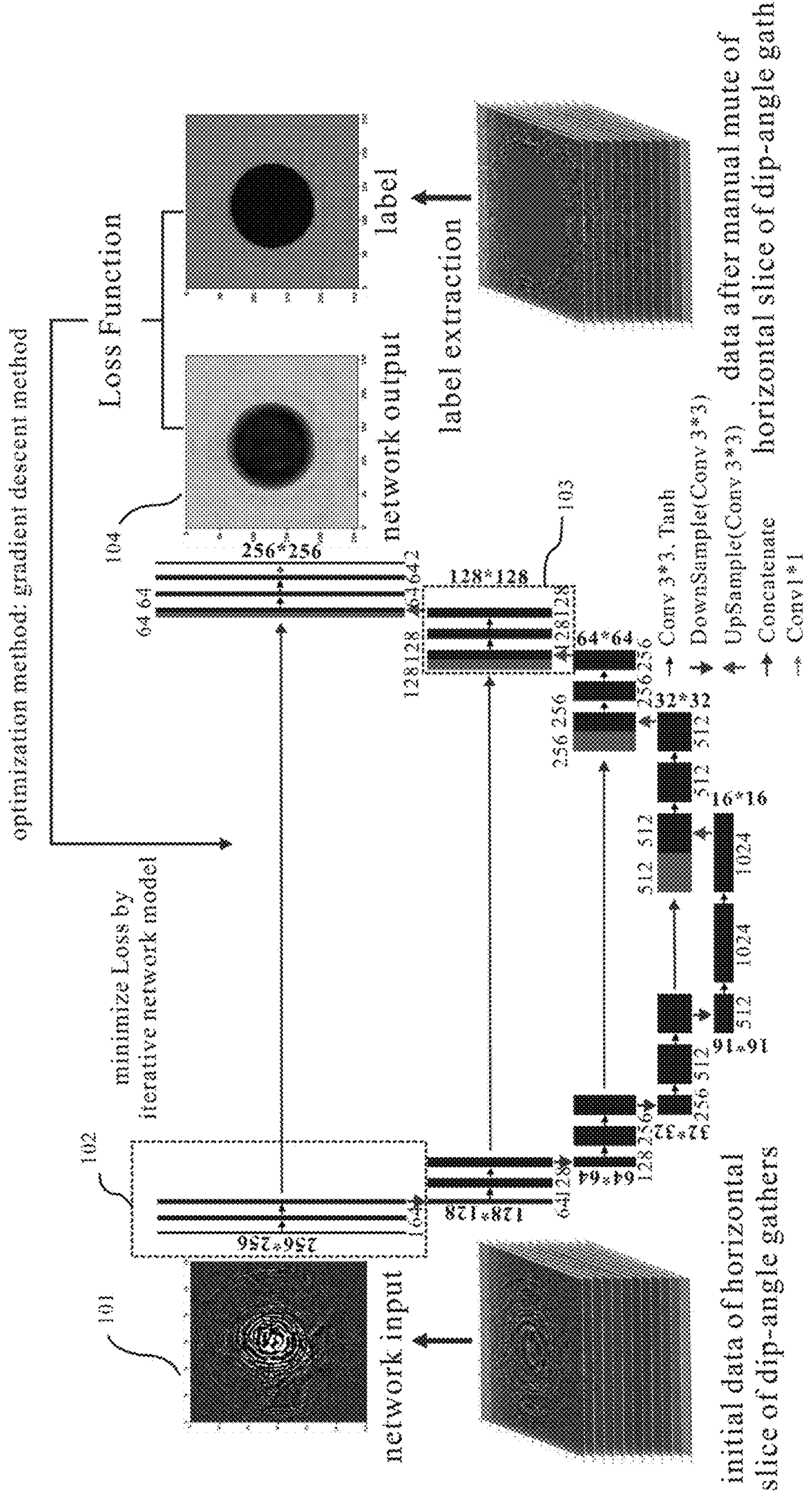
FIG. 1 shows a network structure schematic diagram of a Fresnel zone picking model provided by the embodiments of the present disclosure.

In order to make the objectives, technical solutions, and advantages of the embodiments of the present disclosure clearer, the technical solutions in the embodiments of the present disclosure will be clearly and completely described in conjunction with the drawings in the embodiments of the present disclosure. It is clear that the embodiments described are only partial embodiments of the present disclosure, but not all of the embodiments. The components in the embodiments of the present disclosure generally described and shown in the drawings herein can be arranged and designed in multiple different configurations. Therefore, the following detailed description of embodiments of the present disclosure provided in the drawings is not intended to limit the scope of the present disclosure for which protection is claimed, but rather represents only selected embodiments of the present disclosure. Based on the embodiments in the present disclosure, all other embodiments obtained by a person skilled in the art without inventive efforts fall within the scope of protection of the present disclosure.

The principle of geological detection by using seismic waves is as follows. First, one or more seismic sources and multiple geophones are arranged above the ground, and the seismic waves generated by the multiple seismic sources are sequentially or simultaneously used to transmit below the ground. After being reflected by various geological layers on the ground, the seismic waves are reflected to the ground, and all or some of the geophones are used to receive the reflected seismic waves. Then, a prestack migration processing is conducted using parameters such as the amplitude and traveltime of the detected reflected seismic waves, so as to obtain information of the complex underground structures.

In the prior art, the reflection wave is mainly used for imaging, but the resolution limit of the reflection wave imaging method is one-fourth of the wavelength corresponding to the main frequency of seismic waves. Even if various frequency domain protection or expansion methods are adopted, the resolution still cannot meet the needs of actual production.

The embodiments of the present disclosure adopt diffraction wave imaging. Since the diffraction wave field is generated by small-scale discontinuities in the subsurface, the diffraction waves contain a large amount of high-resolution information about the underground micro-uniform geologic body. Therefore, the diffraction wave has a natural advantage in identifying the small-scale variations of microstructures, which can break through the limitation to the resolution by the wavelength corresponding to the main frequency of seismic waves in the reflection wave imaging, and is of great significance for improving the ability of identifying anomalies of tiny geologic bodies in the oil and gas exploration.

The key of diffraction wave imaging is to separate the diffraction wave and reflection wave, and the energy of the reflection wave is mainly concentrated in the Fresnel zone region. Therefore, it can determine the reflection wave region by picking up the Fresnel zone, so as to separate them.

The prior art acquires the Fresnel zone by manual picking, which is inefficient, and in turn results in low imaging efficiency. Meanwhile, the manual picking results rely heavily on the personal experience of the operator, which results in lower accuracy, thereby affecting the imaging accuracy of the diffraction wave.

Based on this, the embodiments of the present disclosure provide a Fresnel zone picking model and a training method therefor, which are described below by embodiments.

The embodiments of the present disclosure provide a Fresnel zone picking model, as shown in FIG. 1, including an encoder and a decoder.

The encoder includes an input unit 101 and a plurality of feature extraction units 102, and each of the feature extraction units 102 includes a first convolution module, an activation function, and a second convolution module, wherein the activation function is a Tanh activation function, and the second convolution module has a convolution kernel size of 3*3 and a stride of 2.

The Fresnel zone picking model of the embodiments of the present disclosure is improved on the basis of the traditional U-net network structure. In the traditional U-net network, the activation function of the feature extraction unit adopts the LeakyReLU activation function, and this activation function cannot be applied to the seismic wave detection data. There are some negative features in the seismic wave detection data, and these negative features will disappear when adopting the LeakyReLU activation function. Therefore, the embodiments of the present disclosure adopt the Tanh activation function. The Tanh function is continuous and differentiable across the entire real number domain, and maps the input to $(-1,1)$. This means that it can better process and retain the negative information in the seismic wave detection data without causing the negative features to disappear or become less significant like LeakyReLU. Additionally, the Tanh function provides a smoother nonlinear transformation than LeakyReLU, which helps the model to learn more complex patterns and features, especially when dealing with signal data with a rich dynamic range.

The feature extraction unit of the traditional U-net network structure adopts maximum pooling to reduce the spatial resolution of the feature map, which will lead to the loss of some information of the feature map. Therefore, the embodiments of the present disclosure use the second convolution module with a convolution kernel size of 3*3 and a stride of 2 to replace the maximum pooling layer. Compared to the maximum pooling operation, the use of the convolution module for the feature extraction can learn how to best compress the spatial information, rather than simply selecting the maximum value of each region, so that more original information can be retained in the dimensionality-reduced feature map, so as to improve the model performance.

The decoder includes the same number of feature reconstruction units 103 as the feature extraction units, and an output unit 104, and each of the feature reconstruction units 103 includes a deconvolution module.

The deconvolution module gradually restores the feature map to its original spatial resolution. The feature map is sliced and fused with the feature map having the same spatial resolution in the feature reconstruction unit, and finally, and is outputted by the output unit. The output unit is also improved and will be described in the following embodiments, which will not be repeated herein.

Figure 2:
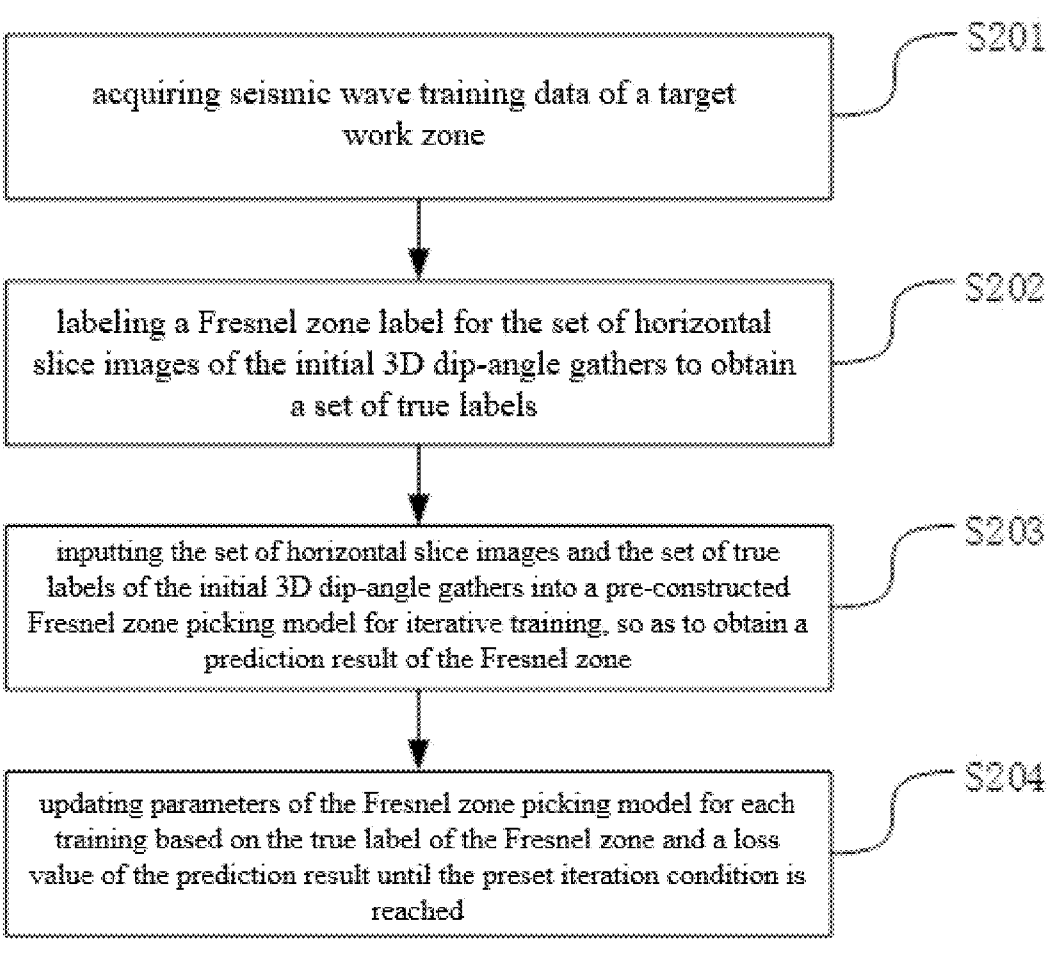
FIG. 2 shows a schematic flow diagram of a training method for a Fresnel zone picking model provided by embodiments of the present disclosure.

For the Fresnel zone picking model constructed in the above embodiments, the embodiments of the present disclosure provide a training method for the Fresnel zone picking model, as shown in FIG. 2, which includes the following steps: S201~S204.

Step S201: acquiring seismic wave training data of a target work zone.

The seismic wave training data includes a set of horizontal slice images of initial 3D dip-angle gathers corresponding to all imaging points on a target imaging line in a seismic wave imaging space.

In the embodiments of the present disclosure, the seismic wave imaging space is a three-dimensional imaging space. The three-dimensional imaging space includes a plurality of imaging lines; each of the imaging lines includes a plurality of common depth points (CDPs); each CDP contains a seismic trace; and the seismic trace includes a plurality of imaging points.

In this step, the target imaging line is a relatively typical imaging line, e.g., some imaging lines may pass through important geological formations, such as faults, fold axes, and salt mounds. These regions are critical for understanding the geological background of the entire exploration region. Therefore, these imaging lines can be determined as target imaging lines. Training with a small amount of dip-angle gather data from representative imaging lines can improve training accuracy.

In this step, it is first to acquire 3D dip-angle gathers corresponding to each imaging point, wherein the dip-angle gathers are obtained by performing the prestack migration processing based on the initial pre-stack gathers. Since the 3D dip-angle gathers are three-dimensional data, and the Fresnel zone picking model process two-dimensional images, the dimensionality reduction processing is required to obtain horizontal slices from the 3D dip-angle gathers.

In a specific example, when any one of the imaging points has a depth of $T_0$, its corresponding 3D dip-angle gathers result is:

$$I(x, y, T_0, \varphi_x, \varphi_y) = \sum_{j=1}^{k} \left(\frac{\tau_s}{\tau_g}\right)^2 f_j'(\tau_s + \tau_g; x_s, y_s, x_g, y_g), \tag{1}$$

where $(x_s, y_s)$ is a coordinate of the source point; (x, y, T) is a coordinate of the imaging point; $(x_g, y_g)$ is a coordinate of the geophone point; $T_0=2T$ is a seismic wave two-way traveltime; $\tau_s$ is a traveltime of the seismic wave propagating from the seismic source to the imaging point; $\tau_g$ is a traveltime propagating from the imaging point to the geophone;

$$f_j'$$

is the first-order time derivative of the time series of the seismic trace; j is the number of the current seismic trace; k is the total number of the seismic traces; $\varphi_x$ is a dip-angle in the x-direction; and $\varphi_y$ is a dip-angle in the y-direction.

During the calculation of the imaging point dip-angle gathers, for the seismic trace numbered j, the corresponding dip-angles $\varphi_x$, $\varphi_y$ are calculated by the following formula:

$$\varphi_x = \arctan\frac{(x_s - x)\tau_g + (x_g - x)\tau_s}{V_{rms}T_0(\tau_s + \tau_g)}, \tag{2}$$

$$\varphi_y = \arctan\frac{(y_s - y)\tau_g + (y_g - y)\tau_s}{V_{rms}T_0(\tau_s + \tau_g)}, \tag{3}$$

where $V_{rms}$ is the root mean square velocity of the imaging point, and other parameters refer to meanings of parameters in formula 1.

Finally, the dimensionality reduction processing is performed on the above 3D dip-angle gathers, i.e., by fixing a given depth $T_0$, the set of horizontal slice images corresponding to each depth is obtained.

Step S202: labeling a Fresnel zone label for the set of horizontal slice images of the initial 3D dip-angle gathers to obtain a set of true labels.

If the horizontal slices of the entire imaging space are labeled, it will be a very large workload. Therefore, in order to reduce the workload and to improve the picking efficiency, in a feasible embodiment, the step of labeling a Fresnel zone label for the set of horizontal slice images of the initial 3D dip-angle gathers to obtain a set of true labels includes the following steps: S2021~S2023.

Step S2021: picking up a Fresnel zone in each horizontal slice in the set of horizontal slice images of the initial 3D dip-angle gathers.

When labeling the Fresnel zone labels in the training phase, the Fresnel zones are first picked up by the human-computer interaction picking method. Specifically, 3D dip-angle gathers are stacked along the x-direction and y-direction, and the position of the stationary phase point $(\varphi_{x_0}, \varphi_{y_0})$ (i.e., the center point of the Fresnel zone) are picked through the human-computer interaction on the stacked profiles in the respective directions, wherein $\varphi_{x_0}$, $\varphi_{y_0}$ respectively correspond to stratum dip-angles in x-direction and y-direction of the stratum where the imaging point is located. Then, the spatial range situation of the Fresnel zone is picked by using the picking results and the Fresnel zone radius formula. Finally, the Fresnel zone label can be obtained by performing horizontal slicing.

In the embodiments of the present disclosure, the Fresnel zone is in an elliptical shape on the horizontal slice. Therefore, by calculating the long-axis radius, the short-axis radius, and the center point of the Fresnel zone, the position and shape of the Fresnel zone of the horizontal slice can be determined.

In a feasible embodiment, the step of picking up the Fresnel zone in each horizontal slice in the set of horizontal slice images of the initial 3D dip-angle gathers includes steps S2021A and S2021B.

Step S2021A: acquiring 3D dip-angle gather data corresponding to the horizontal slice for each horizontal slice in the set of horizontal slice images of the initial 3D dip-angle gathers. The 3D dip-angle gather data includes a seismic wave two-way traveltime, a dip-angle in x-direction and a dip-angle in y-direction corresponding to the seismic trace, and a main frequency of the seismic wave.

Step S2021B: calculating radii of the Fresnel zone in two directions based on the 3D dip-angle gather data and the picking formula of the Fresnel zone, and determining a range of the Fresnel zone based on the radii in the two directions and a position of stationary phase point, wherein the picking formula of the Fresnel zone is:

$$\gamma_x = \arccos\left(\frac{T_0/\cos(\varphi_{x_0}) - f_d/4}{T_0/\cos(\varphi_{x_0})}\right), \tag{4}$$

$$\gamma_y = \arccos\left(\frac{T_0/\cos(\varphi_{y_0}) - f_d/4}{T_0/\cos(\varphi_{y_0})}\right), \tag{5}$$

where $\gamma_x$ is the radius of the Fresnel zone in the x-direction; $\gamma_y$ is the radius of the Fresnel zone in y-direction; $T_0$ is the seismic wave two-way traveltime; $f_d$ is the main frequency of the seismic wave; and $(\varphi_{x_0}, \varphi_{y_0})$ is the stationary phase point of the 3D dip-angle gathers at the imaging point on the corresponding horizontal slice, and $\varphi_{x_0}$, $\varphi_{y_0}$ respectively correspond to stratum dip-angles in x-direction and y-direction of the stratum where the imaging point is located.

Step S2022: muting the picked Fresnel zone.

In the step, the mute of the Fresnel zone is performed manually.

Step S2023: producing the set of true labels according to the set of horizontal slice images after muting the Fresnel zone.

In one embodiment, for example, the region after muting the Fresnel zone is labeled as 0, and the region outside the Fresnel zone is labeled as 1, thus forming a set of true labels.

Figure 3:
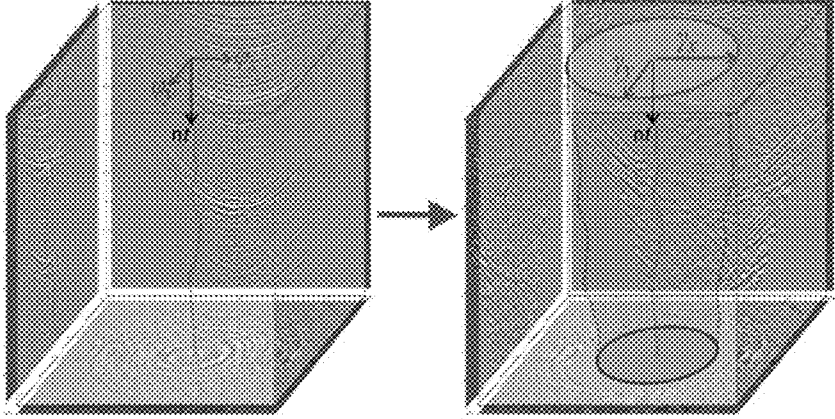
FIG. 3 shows a schematic diagram of comparative results before and after muting a Fresnel zone in three dimensions provided by the embodiments of the present disclosure.

FIG. 3 shows comparative schematic diagrams before and after muting the Fresnel zone region in three dimensions, i.e., in multiple continuous horizontal slices. The left side shows before the mute and the right side shows after the mute.

Since the energy of the reflection wave is mainly in the Fresnel zone region, the reflection wave is suppressed by muting the Fresnel zone, which realizes the separation of the reflection wave and the diffraction wave.

Step S203: inputting the set of horizontal slice images and the set of true labels of the initial 3D dip-angle gathers into a pre-constructed Fresnel zone picking model for iterative training, so as to obtain a prediction result of the Fresnel zone.

Figure 4:
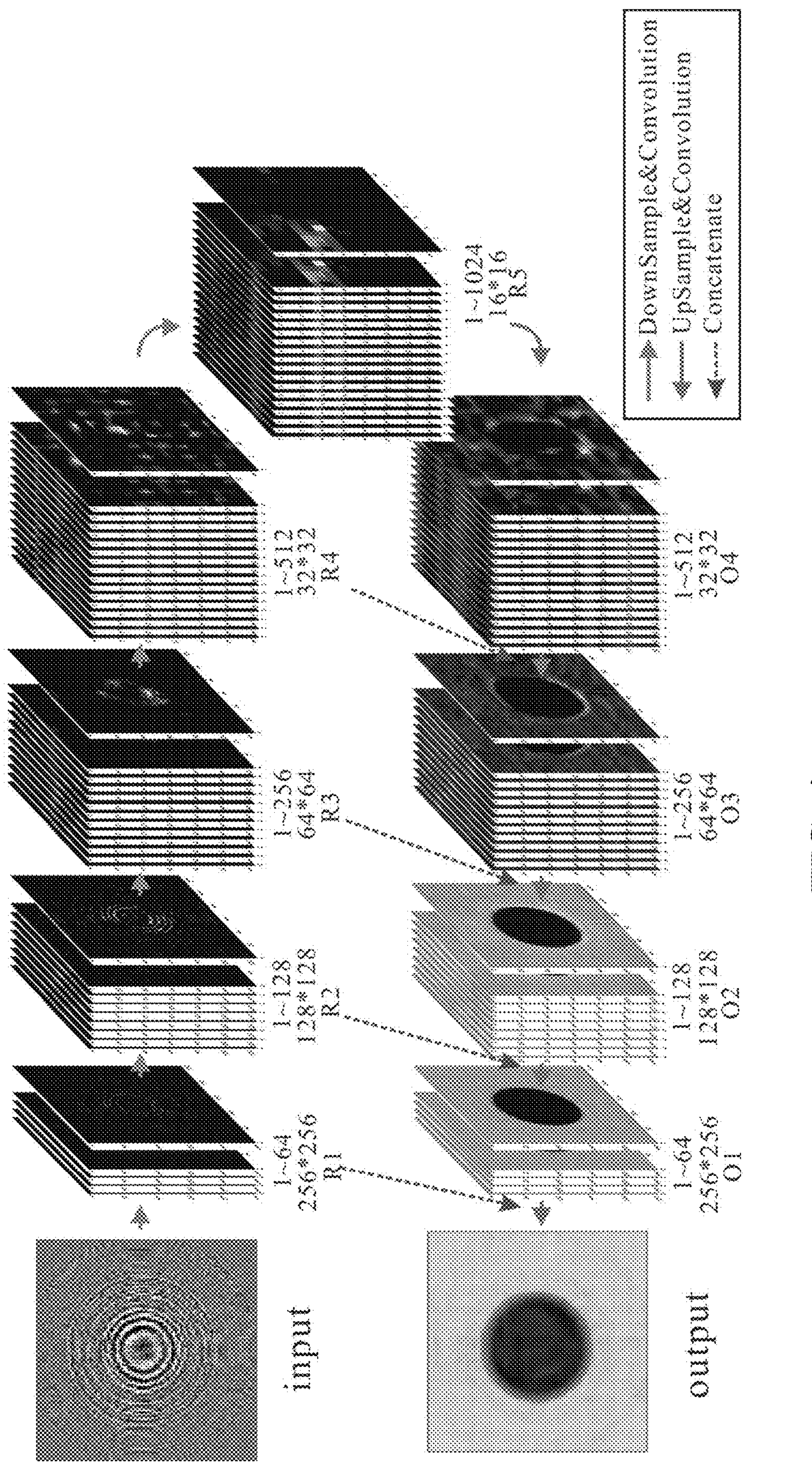
FIG. 4 shows a variation schematic diagram of a set of horizontal slice images in each layer of a Fresnel zone picking model provided by the embodiments of the present disclosure.

FIG. 4 shows a variation schematic diagram of the set of horizontal slice images of the initial 3D dip-angle gathers passing through each layer of the Fresnel zone picking model. In the step, the process of each training is elaborated and illustrated based on the above pre-constructed Fresnel zone picking model, including the following steps: S2031~S2036.

Step S2031: receiving the set of horizontal slice images and the set of true labels of the initial 3D dip-angle gathers based on the input unit of the Fresnel zone picking model.

Step S2032: extracting the Fresnel zone feature of the set of horizontal slice images of the initial 3D dip-angle gathers based on a first convolution module, and detecting an edge of the Fresnel zone in each horizontal slice based on the Fresnel zone feature.

In one embodiment, the first convolution module has a convolution kernel size of 3*3 and a stride of 1.

The Fresnel zone picking model of the embodiments of the present disclosure has the multi-scale feature extraction capability. As shown in FIG. 4, the shallow network mainly extracts local detail features, and the deeper network with a larger sense field extracts more abstract global features. During the process of network training, it not only can fully acquire macroscopic features of the Fresnel zone, such as the shape, position, and the relative relationship between the internal and external energy strengths, but it can also recognize detailed morphologies of the reflection waves, such as the frequency, amplitude, and the features of the seismic events. Therefore, the network not only has the ability to determine the position and shape of the Fresnel zone, but also can effectively detect the remaining reflection wave energy outside the Fresnel zone.

Step S2033: increasing a complexity of the extracted Fresnel zone feature based on the Tanh activation function.

Step S2034: reducing a spatial resolution of each horizontal slice in the set of slice images based on a second convolution module with a convolution kernel size of 3*3 and a stride of 2.

Step S2035: after several feature extractions, gradually recovering the spatial resolution of each horizontal slice in the set of slice images by the deconvolution module, and fusing the horizontal slices with the same spatial resolution in feature extraction and feature reconstruction.

In the step, more original information can be retained and richer detailed features can be extracted by slicing and fusion.

Step S2036: outputting a final prediction result of the detected Fresnel zone by the output unit.

In the embodiments of the present disclosure, since the Fresnel model can effectively detect the remaining reflection wave energy outside the Fresnel zone, the output unit is improved to fully utilize the network to suppress the remaining reflection wave.

The output unit of the traditional U-net network model is a simple binary classification output. This output, especially at the inner and outer edges of the Fresnel zone, is easy to generate high-frequency truncation noise if it is only classified as 0 or 1, which results in an insufficiently smooth edge.

The expression of the improved output unit is:

$$\text{output} = (e^{pro*m} - 1)/(e^{m} - 1), \tag{6}$$

where pro represents the probability value of a single pixel point classified into the Fresnel zone region in the output, represented from 0 to 1; and m represents a parameter controlling the degree of external energy attenuation of the Fresnel zone.

This is a formula converting the original probability value pro (ranging from 0 to 1) to another form of probability value, where m is a control parameter for adjusting the degree of energy attenuation to external of the Fresnel zone.

This conversion method makes the transition close to the inner and external boundaries of the Fresnel zone smoother. By adjusting the parameter m, the degree of smoothness can be controlled, so as to achieve better effect of edge processing. Such processing is particularly important to improve the quality of the prediction result of the model, especially when edges or detailed parts require finer processing.

Specifically, the parameter m controls the speed of the external energy attenuation of the Fresnel zone. The effect of this formula on different pro values is more significant when m is larger, which results in more drastic changes in the output value, especially when pro is close to 0 or 1. On the contrary, a smaller m value results in a smoother variation of the output value, which achieves a smoothing effect at the boundary and reduces the appearance of high-frequency truncation noise.

In some cases, a proper selection of m value can enhance the contrast between the interior and exterior of the Fresnel zone, which helps to improve the accuracy of the model in recognizing the target region.

FIG. 5 shows a comparison schematic diagram of the output result before and after the improvement of the output unit, wherein the left side is before the improvement, and the right side is after the improvement. It can be clearly observed that the edge of the Fresnel zone is smoother after the improvement.

Step S204: updating parameters of the Fresnel zone picking model for each training based on the true label of the Fresnel zone and a loss value of the prediction result until the preset iteration condition is reached.

In this step, the loss function can be a cross-entropy loss function. The preset iteration condition can be reaching a preset number of iterations, or the loss value reaching a preset threshold.

Figure 6:
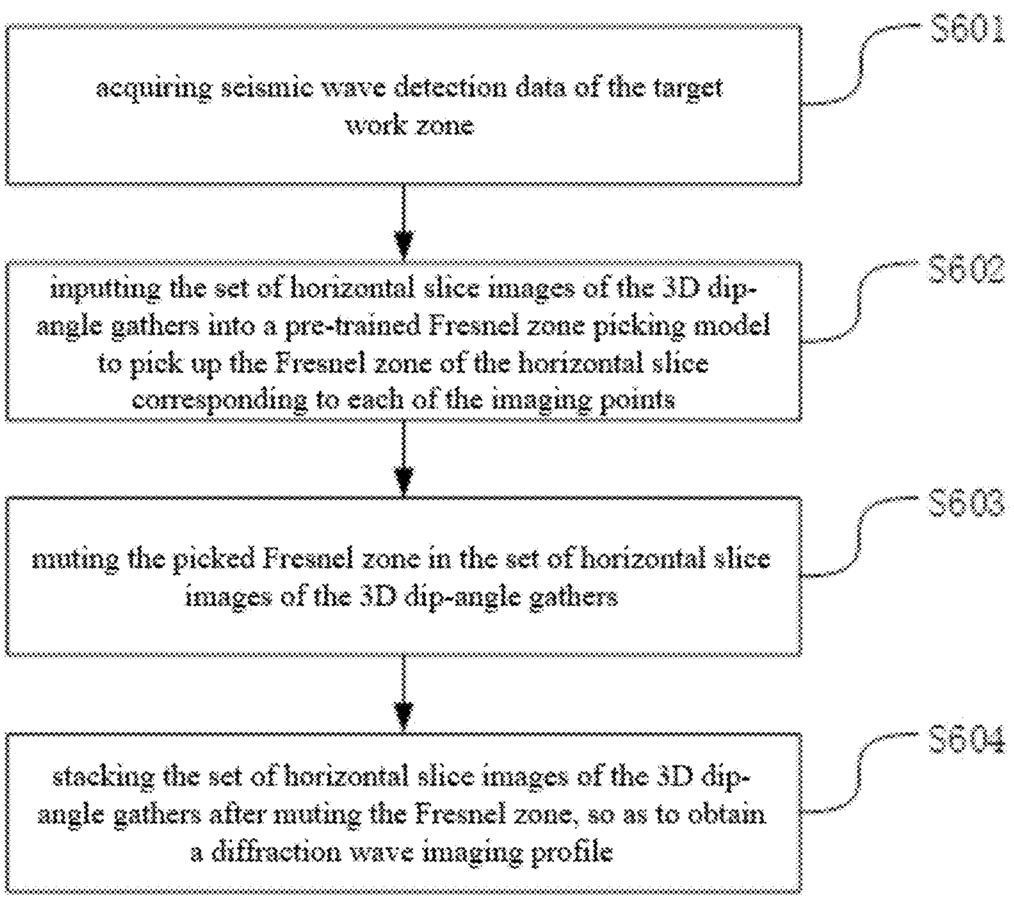
FIG. 6 shows a schematic flow diagram of a diffraction wave imaging method based on machine learning provided by the embodiments of the present disclosure.

Based on the above embodiments, the embodiment of the present disclosure provides a diffraction wave imaging method based on machine learning. As shown in FIG. 6, the method includes the following steps: S601~S604.

Step S601: acquiring seismic wave detection data of the target work zone, wherein the seismic wave detection data includes a set of horizontal slice images of 3D dip-angle gathers corresponding to all imaging points on all imaging lines in the seismic wave imaging space.

It should be noted that the target work zone is the same as the target work zone during training.

Step S602: inputting the set of horizontal slice images of the 3D dip-angle gathers into a pre-trained Fresnel zone picking model to pick up the Fresnel zone of the horizontal slice corresponding to each of the imaging points.

In this step, the specific processing of the model is referred to the above embodiments, and will not be repeated here.

The module outputs the weight coefficient value for smooth muting of the Fresnel zone, that is, the probability distribution of the Fresnel zone.

Step S603: muting the picked Fresnel zone in the set of horizontal slice images of the 3D dip-angle gathers.

In one embodiment, the mute operation can be achieved by multiplying the output result of the Fresnel zone picking model and the input value, so as to obtain a horizontal slice with the muted Fresnel zone. Since the region of the output Fresnel zone is set to 0, by multiplying with the original horizontal slice, the corresponding region of the original horizontal slice is also set to 0, thereby realizing the mute of the Fresnel zone.

Figure 7:
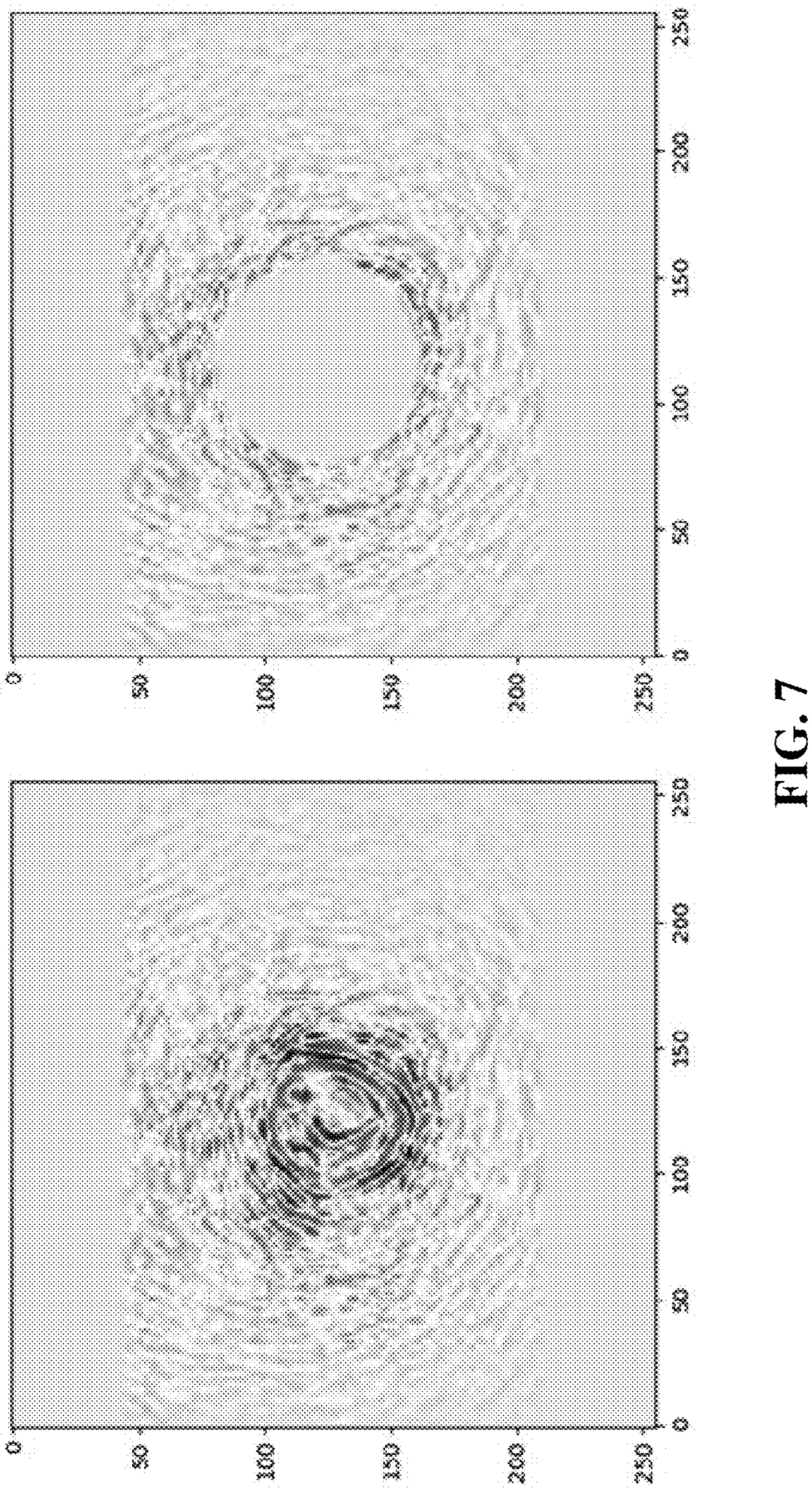
FIG. 7 shows a comparison schematic diagram of a horizontal slice corresponding to imaging points before and after muting the Fresnel zone provided by the embodiments of the present disclosure.

In this step, the mute of the Fresnel zone region can be realized by multiplying the output result with the input horizontal slice. FIG. 7 shows a comparison schematic diagram of a horizontal slice before and after muting the Fresnel zone, wherein the left side shows before the mute, and the right side shows after the mute.

Step S604: stacking the set of horizontal slice images of the 3D dip-angle gathers after muting the Fresnel zone, so as to obtain a diffraction wave imaging profile.

Figure 8:
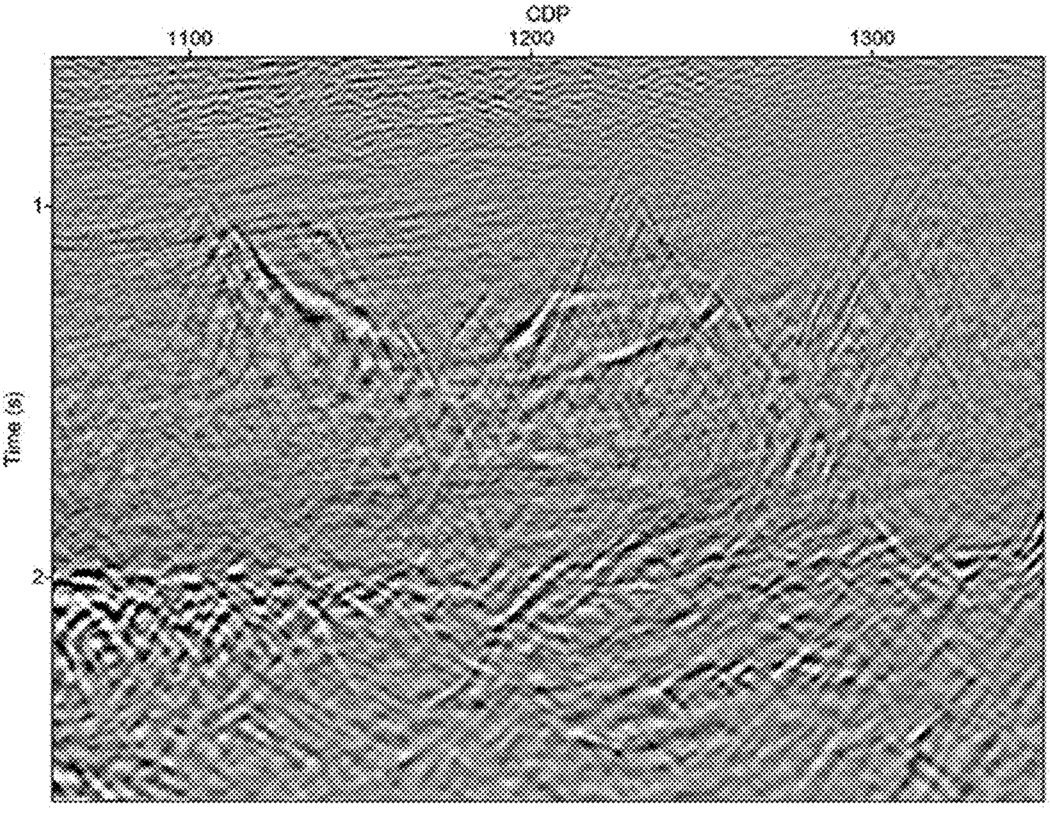
FIG. 8 shows a profile schematic diagram of a diffraction wave imaging provided by the embodiments of the present disclosure.
Figure 9:
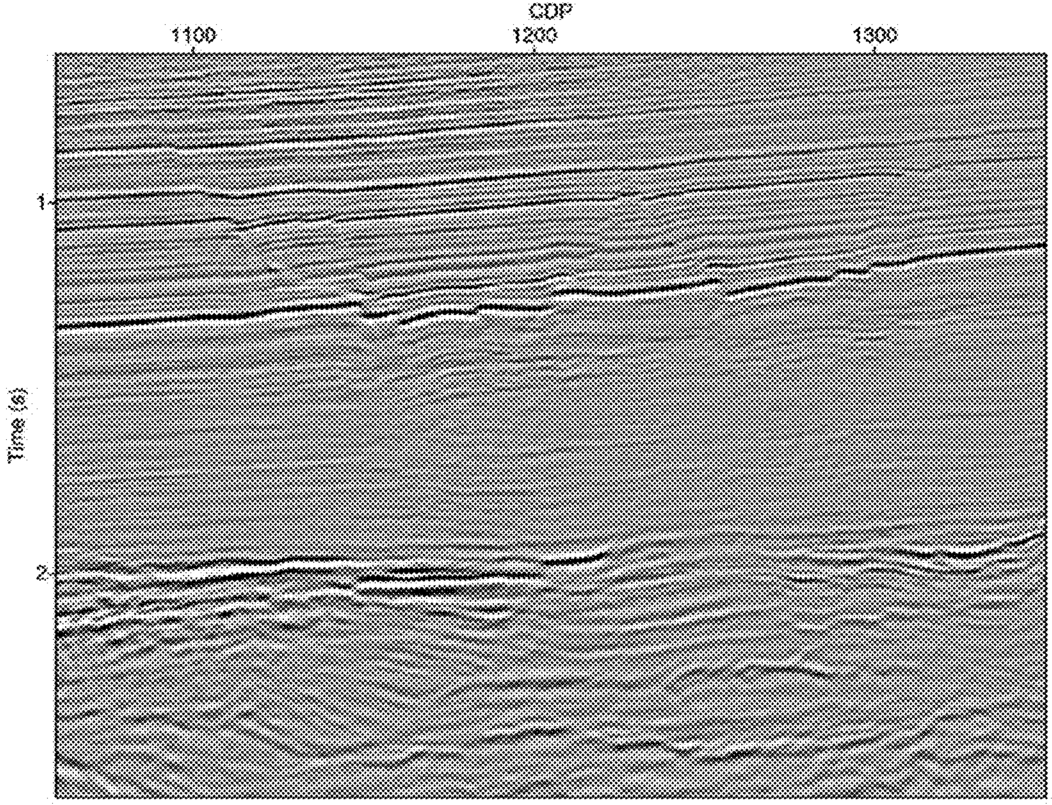
FIG. 9 shows a schematic diagram of a reflection wave imaging profile in the prior art.

In this step, FIG. 8 shows a profile schematic diagram of a diffraction wave imaging obtained by the method of the embodiments of the present disclosure. In order to make the effect of the present disclosure more prominent, it is compared with the traditional reflection wave imaging profile, and FIG. 9 shows a reflection wave imaging profile. FIG. 8 and FIG. 9 show the comparison of the actual data imaging profiles of the same imaging region. It can be seen that there is a good correspondence between the diffraction event in the diffraction wave imaging result and the broken positions of the reflection event in the reflection wave imaging result, which indicates that the machine-learning diffraction wave imaging method based on the 3D stratum dip-angle gathers proposed by the present disclosure can effectively suppress the energy of the reflection wave in the seismic data, thereby realizing the diffraction wave imaging. It can deal with the situation of complex underground structures and reflect the spatial and position relationship of the underground diffractors, which has a higher accuracy compared with the reflection wave imaging method.

Figure 10:
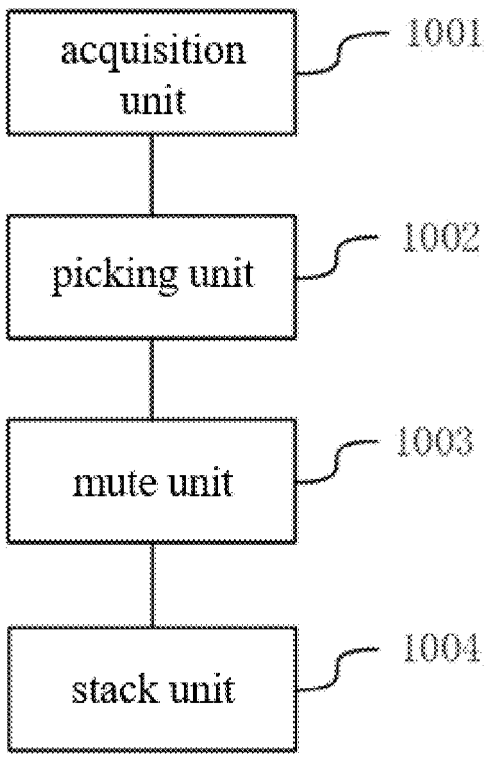
FIG. 10 shows a structure schematic diagram of a diffraction wave imaging device based on machine learning.

Based on the same inventive concept, a diffraction wave imaging device based on machine learning is provided. As shown in FIG. 10, the device includes:

- an acquisition unit 1001, configured to acquire seismic wave detection data of a target work zone, wherein the seismic wave detection data includes a set of horizontal slice images of 3D dip-angle gathers corresponding to all imaging points on all imaging lines in a seismic wave imaging space;
- a picking unit 1002, configured to input the set of horizontal slice images of the 3D dip-angle gathers into the pre-trained Fresnel zone picking model and picking up the Fresnel zone of the horizontal slice corresponding to each of the imaging points;
- a mute unit 1003, configured to mute the picked Fresnel zone in the set of horizontal slice images of the 3D dip-angle gathers; and
- a stack unit 1004, configured to stack the set of horizontal slice images of the 3D dip-angle gathers after mute of the Fresnel zone, so as to obtain a diffraction wave imaging profile.

Figure 11:
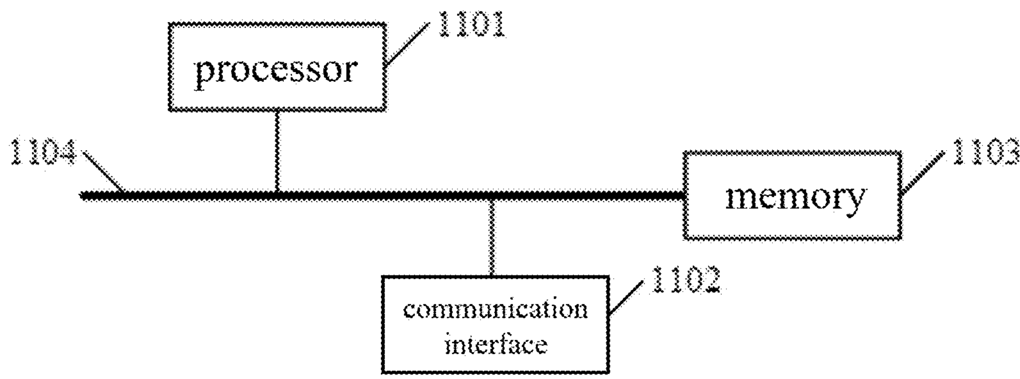
FIG. 11 shows a structure schematic diagram of an electronic device provided by the embodiments of the present disclosure.

Based on the same technical concept, the embodiments of the present disclosure further provide an electronic device, as shown in FIG. 11, including a processor 1101, a communication interface 1102, a memory 1103, and a communication bus 1104, wherein the processor 1101, the communication interface 1102, and the memory 1103 are communicated with each other via the communication bus 1104.

The memory 1103 is configured to store computer programs.

The processor 1101 is configured to realize the steps in the training method for the Fresnel zone picking model and the diffraction wave imaging method based on machine learning when executing programs stored in the memory 1103.

The communication bus mentioned in the above electronic device can be the peripheral component interconnect (PCI) bus or the extended industry standard architecture (EISA) bus. The communication bus can be divided into address bus, data bus, and control bus, etc. For ease of representation, only one bold line is shown in the figure, but it does not indicate that there is only one bus or one type of bus.

The communication interface is used for communication between the above electronic devices and other devices.

The memory may include random access memory (RAM) or non-volatile memory (NVM), e.g., at least one disk memory. Optionally, the memory can also be at least one storage device located away from the foregoing processor.

The processor described above can be a general-purpose processor, including a central processing unit (CPU) and a network processor (NP); or it can also be a digital signal processing (DSP), an application specific integrated circuit (ASIC), a field-programmable gate array (FPGA), or other programmable logic devices, discrete gates, transistor logic devices, or discrete hardware components.

The computer program product for performing the training method for the Fresnel zone picking model and the diffraction wave imaging method based on machine learning includes computer-readable storage medium storing program code. The instructions included by the program code can be used to execute the methods in the foregoing embodiments. The specific implementation can be referred to embodiments of the methods, which will not be repeated herein.

The device of diffraction wave imaging method based on machine learning provided by the embodiments of the present disclosure can be specific hardware on the device or software or firmware installed on the device. The device provided by the embodiments of the present disclosure has the same realization principle and the same technical effect as foregoing embodiments of methods. For a brief description, what is not mentioned in the embodiments of the device, reference can be made to the corresponding contents in the foregoing embodiments. It is clearly understood by those skilled in the field that for the convenience and brevity of the description, the specific working process of the system, device, and unit described above can refer to the corresponding process in the above method embodiments, and will not be repeated herein.

In the embodiments provided by the present disclosure, it should be understood that the disclosed device and method can also be realized in other ways. The embodiments of the device described above are only illustrative, for example, the division of the units is only a logical functional division, and it can be divided in another way when actually realized, or for example, multiple units or components can be combined or can be integrated into another system, or some features can be ignored, or not be executed. Additionally, the mutual coupling or direct coupling or communication connection shown or discussed can be an indirect coupling or communication connection via some communication interfaces, devices, or units, which can be electrical, mechanical, or other forms.

The unit illustrated as a separated component can or cannot be physically separated, and the components shown as a unit can or cannot be a physical unit, i.e., it can be located on a single place, or it can be distributed on a plurality of network units. Some or all of these units can be selected to fulfill the objective of the solution of the embodiment according to actual needs.

Additionally, the various functional units provided by the embodiments of the present disclosure can be integrated to form one process unit; each unit may physically exist individually, or two or more units may be integrated into a single unit.

If realized in the form of a software functional unit and sold or used as an individual product, the function can be stored in a computer readable storage medium. Based on this understanding, the technical solution of the present disclosure in essential, the part contributing to the prior art, or the part of the technical solutions can be embodied in the form of the software product. The computer software product is stored in a storage medium, including several instructions to cause a computer device (which can be a personal computer, a server, or a network device, etc.) to perform all or part of the steps of the method described in each embodiment of the present disclosure. The foregoing storage medium includes: U disk, portable hard disk, ROM (read only-memory), RAM (random access memory), disk, disc, or other medium that can store the program code.

It should be noted that similar symbols and letters denote similar items in the following drawings, so that once an item is defined in a drawing, no further definition or explanation is required in the subsequent drawings. Furthermore, the terms “first”, “second”, “third”, etc., are used only to differentiate the description, and are not to be understood as indicating or implying relative importance.

Finally, it should be noted that the above embodiments are only specific embodiments of the present disclosure, which are used to describe the technical solutions of the present disclosure, rather than to limit it, and the scope of protection of the present disclosure is not limited to this. Although the present disclosure is described in detail with reference to the foregoing embodiments, it should not be difficult for a person skill in the art to understand that within the scope of the technology disclosed herein, any technical person familiar with the technical field can still modify or easily think of changes to the technical solutions recorded in the foregoing embodiments, or make equivalent replacement for partial technical features therein; and these modification, changes, or replacement shall not remove the essence of the corresponding technical solution from the spirit and scope of the technical solutions of each embodiment of the present disclosure, and they are all within the scope of protection of the present disclosure. Therefore, the scope of protection of the present disclosure shall be governed by the scope of protection of the claims.

The invention claimed is:

1. A diffraction wave imaging method based on machine learning, wherein the method comprises:

acquiring seismic wave detection data of a target work zone, wherein the seismic wave detection data comprises a set of horizontal slice images of 3D dip-angle gathers corresponding to all imaging points on all imaging lines in a seismic wave imaging space;

inputting the set of horizontal slice images of the 3D dip-angle gathers into a pre-trained Fresnel zone picking model to pick up a Fresnel zone of a horizontal slice corresponding to each of the imaging points;

muting the picked Fresnel zone in the set of horizontal slice images of the 3D dip-angle gathers; and stacking the set of horizontal slice images of the 3D dip-angle gathers after muting the Fresnel zone, so as to obtain a diffraction wave imaging profile for identifying small-scale variations of subsurface microstructures;

wherein the Fresnel zone picking model is trained by a training method comprising:

acquiring seismic wave training data of a target work zone, wherein the seismic wave training data comprises a set of horizontal slice images of initial 3D dip-angle gathers corresponding to all imaging points on a target imaging line in a seismic wave imaging space;

labeling a Fresnel zone label for the set of horizontal slice images of the initial 3D dip-angle gathers to obtain a set of true labels;

inputting the set of horizontal slice images and the set of true labels of the initial 3D dip-angle gathers into a pre-constructed Fresnel zone picking model for iterative training, so as to obtain a prediction result of the Fresnel zone; and updating parameters of the Fresnel zone picking model for each training based on the true labels of the Fresnel zone and a loss value of the prediction result until a preset iteration condition is reached;

wherein the step of labeling a Fresnel zone label for the set of horizontal slice images of the initial 3D dip-angle gathers to obtain a set of true labels comprises:

picking up a Fresnel zone in each horizontal slice in the set of horizontal slice images of the initial 3D dip-angle gathers;

muting the picked Fresnel zone; and producing the set of true labels according to the set of horizontal slice images after muting the Fresnel zone; and wherein the Fresnel zone is in an elliptical shape on the horizontal slices, and the step of picking up a Fresnel zone in each horizontal slice in the set of horizontal slice images of the initial 3D dip-angle gathers comprises:

acquiring 3D dip-angle gather data corresponding to the horizontal slice for each horizontal slice in the set of horizontal slice images of the initial 3D dip-angle gathers, wherein the 3D dip-angle gather data comprises a seismic wave two-way traveltime, a dip-angle in x-direction and a dip-angle in y-direction corresponding to a seismic trace, and a main frequency of the seismic wave;

calculating radii of the Fresnel zone in two directions based on the 3D dip-angle gather data and a picking formula of the Fresnel zone, and determining a range of the Fresnel zone based on the radii in the two directions and a stationary phase point, wherein the picking formula of the Fresnel zone is:

$$\gamma_x = \arccos\left(\frac{T_0/\cos(\varphi_{x0}) - f_d/4}{T_0/\cos(\varphi_{x0})}\right),$$

$$\gamma_y = \arccos\left(\frac{T_0/\cos(\varphi_{y0}) - f_d/4}{T_0/\cos(\varphi_{y0})}\right),$$

where $\gamma_x$ is a radius of the Fresnel zone in x-direction; $\gamma_y$ is a radius of the Fresnel zone in y-direction; $T_0$ is the seismic wave two-way traveltime; $f_d$ is the main frequency of the seismic wave; $(\varphi_{x_0}, \varphi_{y_0})$ is the stationary phase point of the 3D dip-angle gathers at an imaging point on a corresponding horizontal slice; and $\varphi_{x_0}$, $\varphi_{y_0}$ respectively correspond to stratum dip-angles in x-direction and y-direction of the stratum where the imaging point is located.

2. An electronic device, comprising a processor, a communication interface, a memory, and a communication bus, wherein the processor, the communication interface, and the memory are communicated with each other via the communication bus, wherein the memory is configured to store computer programs, and the processor is configured to realize steps in the method according to claim 1 when executing programs stored in the memory.

3. A computer-readable storage medium, wherein the computer-readable storage medium stores a computer program, and steps of the method according to claim 1 is realized when the computer program is executed by a processor.

4. The diffraction wave imaging method based on machine learning according to claim 1, wherein each training process of the iterative training comprises:

receiving the set of horizontal slice images and the set of true labels of the initial 3D dip-angle gathers based on the input unit of the Fresnel zone picking model;

extracting a Fresnel zone feature of the set of horizontal slice images of the initial 3D dip-angle gathers based on the first convolution module, and detecting an edge of the Fresnel zone in each slice based on the Fresnel zone feature, wherein the Fresnel zone feature at least comprises a shape, a position, and a relative relationship between internal and external energy strengths of the Fresnel zone;

increasing a complexity of the extracted Fresnel zone feature based on the Tanh activation function;

reducing a spatial resolution of each horizontal slice in the set of slice images based on the second convolution module with a convolution kernel size of 3*3 and a stride of 2;

gradually recovering the spatial resolution of each horizontal slice in the set of slice images by the deconvolution module after several feature extractions, and fusing the horizontal slices with the same spatial resolution in feature extraction and feature reconstruction; and outputting a final prediction result of the detected Fresnel zone by the output unit.

5. The diffraction wave imaging method based on machine learning according to claim 4, wherein an expression of the output unit is:

$$\text{output} = (e^{pro*m} - 1)/(e^m - 1),$$

where pro represents a probability value of a single pixel point classified into the Fresnel zone region in the output, represented by a value from 0 to 1; and m represents a parameter controlling a degree of external energy attenuation of the Fresnel zone.

6. A diffraction wave imaging device based on machine learning, wherein the device comprises:

an acquisition unit, configured to acquire seismic wave detection data of a target work zone, wherein the seismic wave detection data comprises a set of horizontal slice images of 3D dip-angle gathers corresponding to all imaging points on all imaging lines in a seismic wave imaging space;

a picking unit, configured to input the set of horizontal slice images of the 3D dip-angle gathers into a pre-trained Fresnel zone picking model to pick up a Fresnel zone of a horizontal slice corresponding to each of the imaging points;

a mute unit, configured to mute the picked Fresnel zone in the set of horizontal slice images of the 3D dip-angle gathers; and a stack unit, configured to stack the set of horizontal slice images of the 3D dip-angle gathers after muting the Fresnel zone, so as to obtain a diffraction wave imaging profile for identifying small-scale variations of subsurface microstructures;

wherein the Fresnel zone picking model is trained by a training method comprising:

acquiring seismic wave training data of a target work zone, wherein the seismic wave training data comprises a set of horizontal slice images of initial 3D dip-angle gathers corresponding to all imaging points on a target imaging line in a seismic wave imaging space;

labeling a Fresnel zone label for the set of horizontal slice images of the initial 3D dip-angle gathers to obtain a set of true labels;

inputting the set of horizontal slice images and the set of true labels of the initial 3D dip-angle gathers into a pre-constructed Fresnel zone picking model for iterative training, so as to obtain a prediction result of the Fresnel zone; and updating parameters of the Fresnel zone picking model for each training based on the true labels of the Fresnel zone and a loss value of the prediction result until a preset iteration condition is reached;

wherein the step of labeling a Fresnel zone label for the set of horizontal slice images of the initial 3D dip-angle gathers to obtain a set of true labels comprises:

picking up a Fresnel zone in each horizontal slice in the set of horizontal slice images of the initial 3D dip-angle gathers;

muting the picked Fresnel zone; and producing the set of true labels according to the set of horizontal slice images after muting the Fresnel zone; and wherein the Fresnel zone is in an elliptical shape on the horizontal slices, and the step of picking up a Fresnel zone in each horizontal slice in the set of horizontal slice images of the initial 3D dip-angle gathers comprises:

acquiring 3D dip-angle gather data corresponding to the horizontal slice for each horizontal slice in the set of horizontal slice images of the initial 3D dip-angle gathers, wherein the 3D dip-angle gather data comprises a seismic wave two-way traveltime, a dip-angle in x-direction and a dip-angle in y-direction corresponding to a seismic trace, and a main frequency of the seismic wave;

calculating radii of the Fresnel zone in two directions based on the 3D dip-angle gather data and a picking formula of the Fresnel zone, and determining a range of the Fresnel zone based on the radii in the two directions and a stationary phase point, wherein the picking formula of the Fresnel zone is:

$$\gamma_x = \arccos\left(\frac{T_0/\cos(\varphi_{x0}) - f_d/4}{T_0/\cos(\varphi_{x0})}\right),$$

$$\gamma_y = \arccos\left(\frac{T_0/\cos(\varphi_{y0}) - f_d/4}{T_0/\cos(\varphi_{y0})}\right),$$

where $\gamma_x$ is a radius of the Fresnel zone in x-direction; $\gamma_y$ is a radius of the Fresnel zone in y-direction; $T_0$ is the seismic wave two-way traveltime; $f_d$ is the main frequency of the seismic wave; $(\varphi_{x_0}, \varphi_{y_0})$ is the stationary phase point of the 3D dip-angle gathers at an imaging point on a corresponding horizontal slice; and $\varphi_{x_0}$, $\varphi_{y_0}$ respectively correspond to stratum dip-angles in x-direction and y-direction of the stratum where the imaging point is located.

7. The diffraction wave imaging device based on machine learning according to claim 6, wherein each training process of the iterative training comprises:

receiving the set of horizontal slice images and the set of true labels of the initial 3D dip-angle gathers based on the input unit of the Fresnel zone picking model;

extracting a Fresnel zone feature of the set of horizontal slice images of the initial 3D dip-angle gathers based on the first convolution module, and detecting an edge of the Fresnel zone in each slice based on the Fresnel zone feature, wherein the Fresnel zone feature at least comprises a shape, a position, and a relative relationship between internal and external energy strengths of the Fresnel zone;

increasing a complexity of the extracted Fresnel zone feature based on the Tanh activation function;

reducing a spatial resolution of each horizontal slice in the set of slice images based on the second convolution module with a convolution kernel size of 3*3 and a stride of 2;

gradually recovering the spatial resolution of each horizontal slice in the set of slice images by the deconvolution module after several feature extractions, and fusing the horizontal slices with the same spatial resolution in feature extraction and feature reconstruction; and outputting a final prediction result of the detected Fresnel zone by the output unit.

8. The diffraction wave imaging device based on machine learning according to claim 7, wherein an expression of the output unit is:

$$\text{output} = (e^{pro*m} - 1)/(e^m - 1),$$

where pro represents a probability value of a single pixel point classified into the Fresnel zone region in the output, represented by a value from 0 to 1; and m represents a parameter controlling a degree of external energy attenuation of the Fresnel zone.

* * * * *